May 1, 1945.　　　D. C. HEITSHU　　　2,375,104
CONVEYING AND HANDLING UNIT
Filed Oct. 20, 1943　　　5 Sheets-Sheet 1

INVENTOR.
Daniel C. Heitshu
BY
Barnes, Kisselle, Laughlin & Raisch
Attorneys

May 1, 1945.  D. C. HEITSHU  2,375,104
CONVEYING AND HANDLING UNIT
Filed Oct. 20, 1943   5 Sheets-Sheet 2

INVENTOR.
Daniel C. Heitshu
BY
Barnes, Kisselle, Laughlin & Raisch
Attorneys

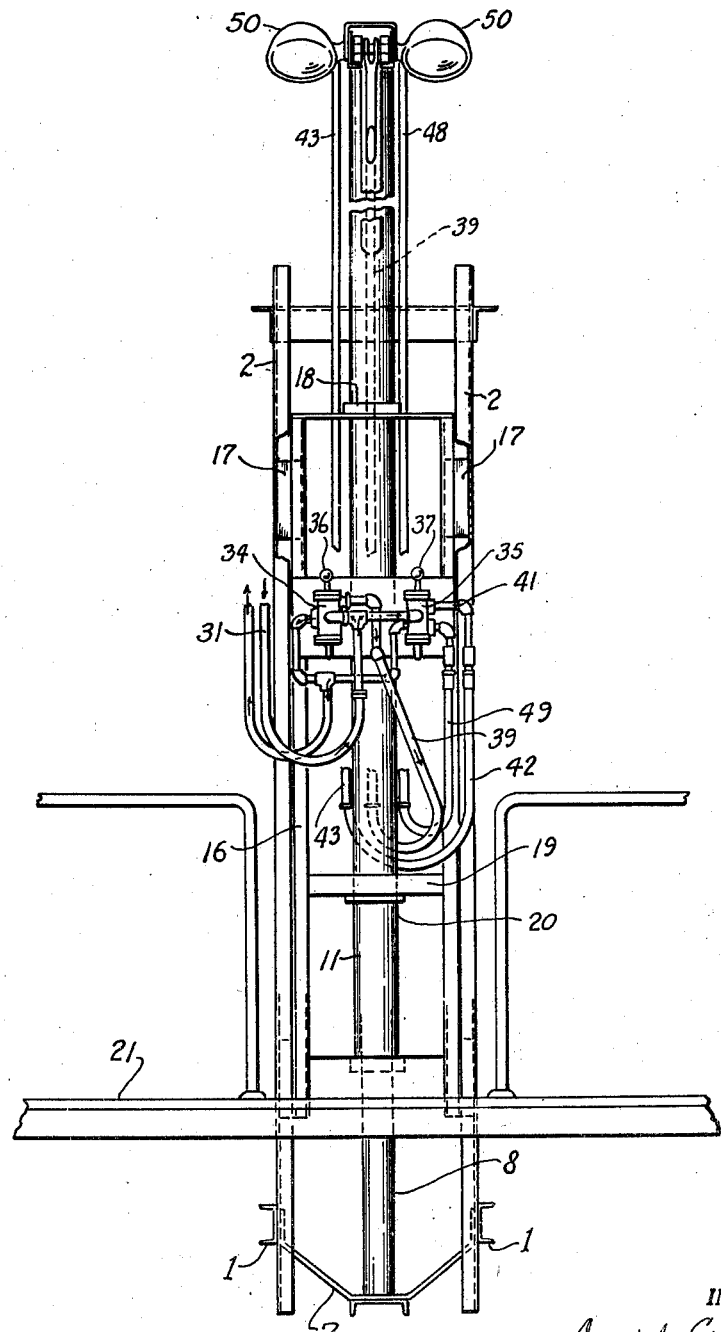

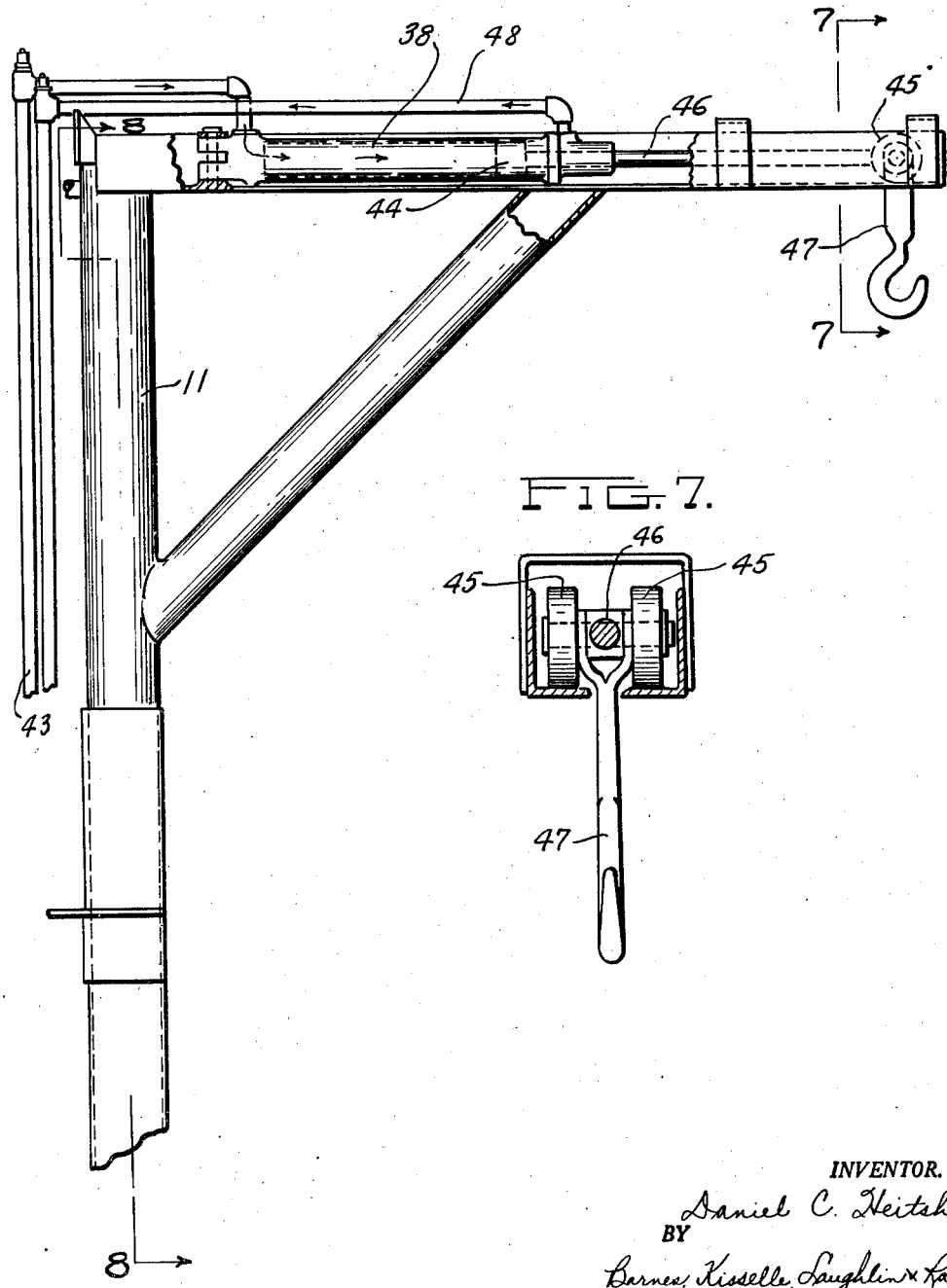

May 1, 1945.  D. C. HEITSHU  2,375,104
CONVEYING AND HANDLING UNIT
Filed Oct. 20, 1943   5 Sheets-Sheet 5
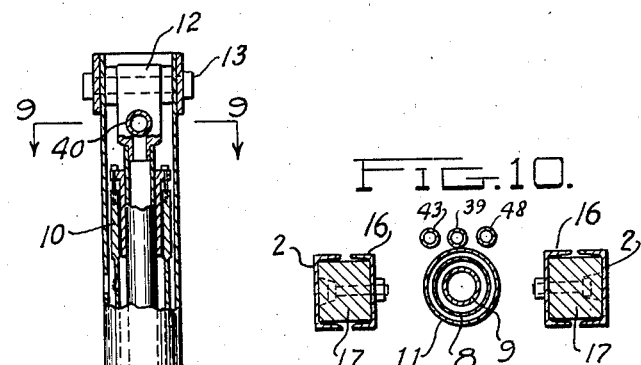
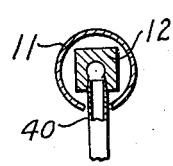
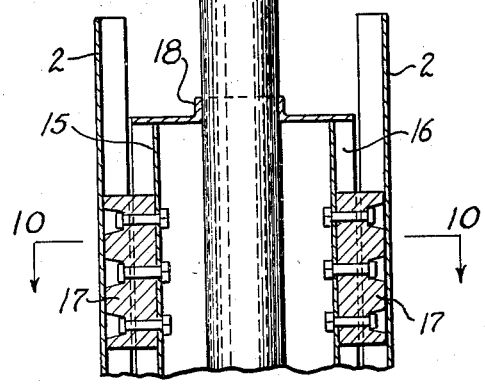
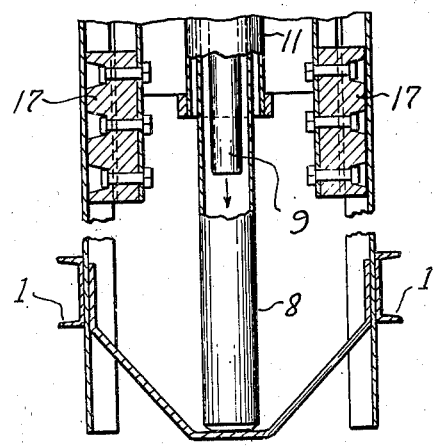
INVENTOR.
Daniel C. Heitshu
BY Barnes, Kisselle, Laughlin & Raisch
Attorneys Patented May 1, 1945

2,375,104

UNITED STATES PATENT OFFICE 2,375,104

CONVEYING AND HANDLING UNIT

Daniel C. Heitshu, Brightmoor, Mich., assignor to Harry Ferguson, Inc., Dearborn, Mich., a corporation of Delaware Application October 20, 1943, Serial No. 506,921

7 Claims. (Cl. 212—1)

This invention relates to a propeller handling and aircraft servicing unit.

It is the object of the invention to provide a combined hoist and carriage for lifting and setting operations which can be applied to and operated by the power take-off on a tractor. It is designed especially for handling airplane propellers by taking them off the dollies on which they are carried and setting them in place on the airplane. Additional use of this unit comprises attachment or removal of other parts needing servicing on an airplane, such as ailerons, rudders, de-icers, etc. This apparatus may be applied directly to a commercial tractor and operated by the power take-off shaft of the tractor. This will more fully appear hereinafter.

In the drawings

Fig. 5 is a view of the mast showing particularly the control valves.

Fig. 6 is an elevational view of the top of the lift showing the ram and the lifting arm together with the horizontal cylinder of the ram.

Fig. 7 is a section on the line 7—7 of Fig. 6.

Fig. 8 is a section on the line 8—8 of Fig. 6.

Fig. 9 is a section on the line 9—9 of Fig. 8.

Fig. 10 is a section on the line 10—10 of Fig. 8.

Figure 1:
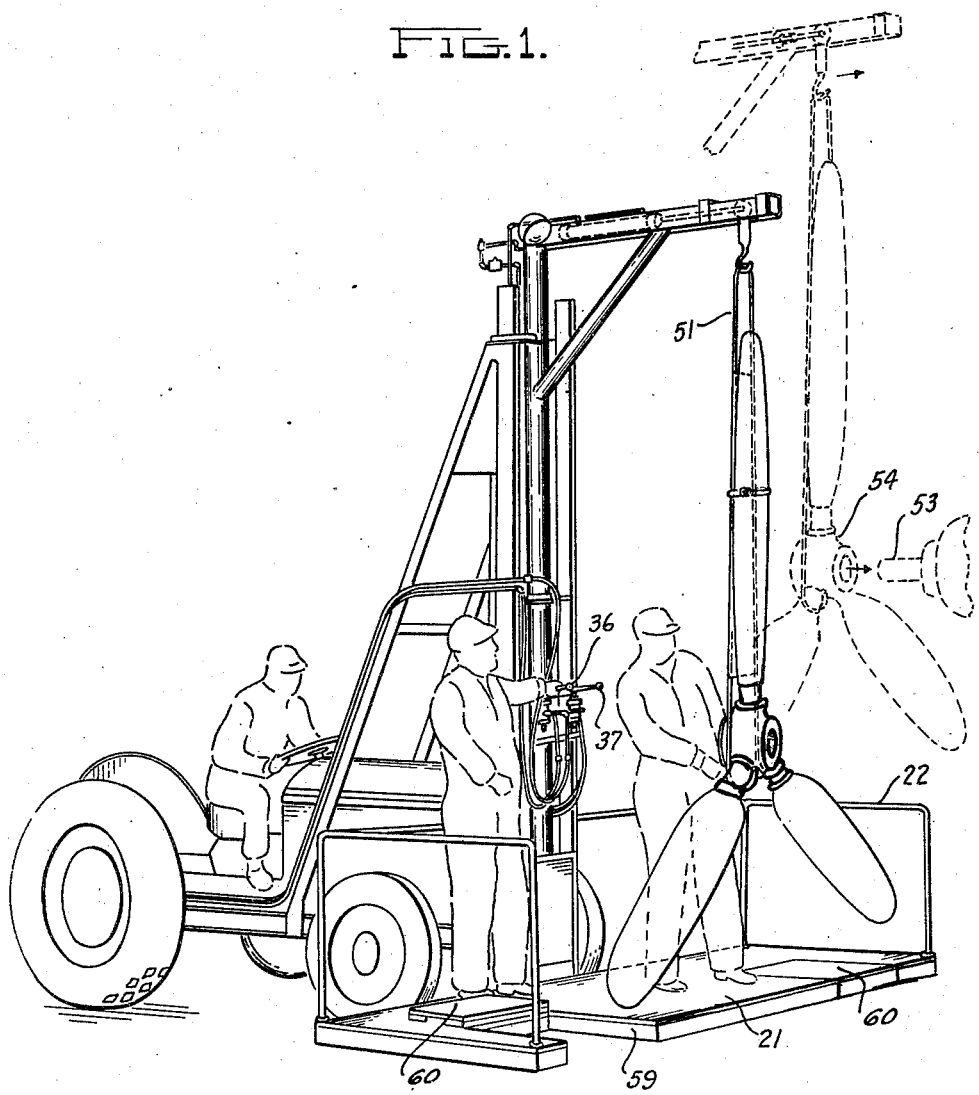
Fig. 1 shows the apparatus in process of lifting a propeller and applying it to the propeller shaft of the airplane engine.
Figure 3:
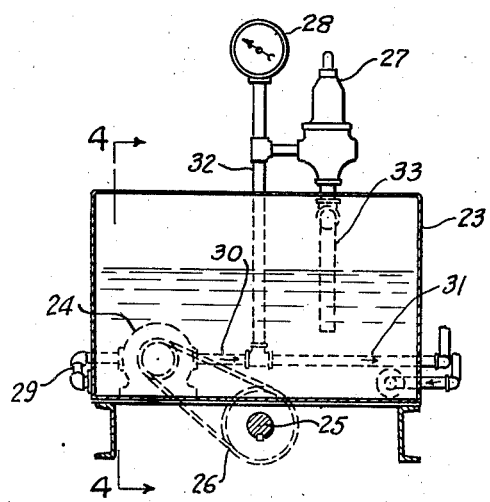
Fig. 3 is a section on the line 3—3 of Fig. 2.
Figure 2:
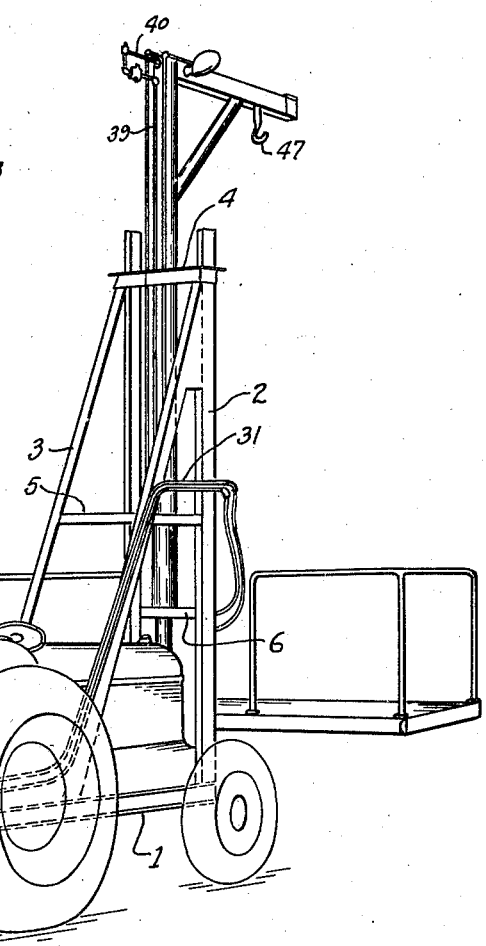
Fig. 2 is a perspective showing the tractor equipped with the propeller handling unit.

Referring to Figs. 1 and 2, it will be seen that the lifting and handling apparatus comprises a frame which can be secured directly to the chassis frame of the tractor. The tractor is provided with the usual engine or power plant. The frame comprises the sills 1, the uprights 2 and the diagonal braces 3. These can be suitable channel bars. Cross braces 4, 5 and 6 tie the frame parts together. At the bottom of the frame (see Fig. 5) a cradle 7 is underslung from the sills 1. This supports the post or mast 8 which also forms a ram cylinder (see Fig. 8). The ram 9 is hollow and is guided in the cylinder 8 by means of guide sleeves 10. On the outside of the ram cylinder 8 is a hollow elevator shaft 11 which encloses both the ram cylinder 8 and the hollow ram 9, as shown in Figs. 8 and 10. This hollow elevator shaft is secured to the head 12 of the ram by means of the bolt 13. The channel section uprights 2 act as guides or tracks for the slide 15 which is formed by the channel bars 16 (see Fig. 10). Bolted in these channel bars 16 are the blocks 17 which slide in these tracks 2. Channel bars 16 are fastened to the hollow elevator shaft by the collar 18. Referring to Fig. 5 it will be seen that this slide or elevator has the upright channel bars 16 connected by cross bars 19 that rest on the collar 20 of the hollow elevator shaft. At the bottom of the elevator frame formed by the uprights 16 and the cross bars 20 is secured an elevator platform 21 provided with a fence or guard rail 22 on three sides. Notches 59 in the floor of the platform can straddle the wheels of the dolly when the tractor is drawn up to reverse the work. Folding doors 60 are used to close these openings when the openings are not used to straddle the wheels.

Figure 4:
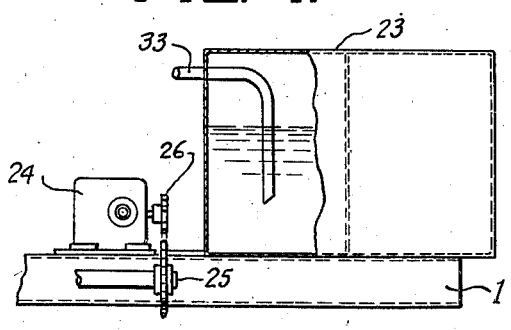
Fig. 4 is a section on the line 4—4 of Fig. 3.

The ram is caused to rise and fall in the ram cylinder by hydraulic pressure. An oil reservoir 23 (Fig. 2) is secured on the rear ends of the sills 1. A pump 24 (Fig. 4) is driven by the take-off shaft 25 of the tractor through a sprocket and chain 26. Oil is pumped from the tank by means of the pipe 29, thence through pipe 30 to the outlet pipe 31. The oil also passes into the bypass pipe 32 that leads to the gage 28 and relief valve 27. If the control valves are not open the oil passes through the bypass pipe 32 to relief valve 27 and is returned to the storage tank through pipe 33. The pressure pipe 31 leads to the two valves 34 and 35 where the control handles 36 and 37 may be operated to control the flow of the oil to the vertical ram cylinder 8 and the horizontal cylinder 38 (see Fig. 6). Referring to Fig. 5 it will be seen that the oil passes from valve 34 to the downgoing flexible conduit 39 which then turns and rises. The oil enters the ram near the top at the port 40, passes down on the inside of the ram in the cylinder 8 and is effective on the ram in the closed upper end. The pump, the reservoir and bypass and relief valve constitute a hydraulic power plant.

The oil enters the valve 35 (Fig. 5) at the midpoint and passes out the pipe 41 and then down through flexible conduit 42 and passes upwardly through conduit 43. It then passes into the cylinder 38 in which is guided the horizontal piston 44 which is connected with a carriage 45 by means of the rod 46. On this carriage is hung the hook 47. The oil in front of the piston 44 escapes through pipe 48 and returns to the valve 35 through the flexible conduit 49.

A pair of flood lights 50 is fastened to the top of the horizontal arm of the elevator for illumination at night.

The operation is as follows: As long as the take-off shaft is being rotated by the tractor motor the oil is pumped out of the tank, but if the control valves are not open the oil returns to the tank through the bypass pipe and the relief valve. As soon as one of the valves is opened, either the elevator is raised or lowered or the horizontal piston is caused to travel, carrying with it the carriage and the hook. The take-off shaft may be disconnected from the tractor motor by means of a suitable clutch or sliding gear (not shown). With the elevator in its lowermost position, as shown in Fig. 1, a propeller can be taken off a dolly (not shown) and suspended in the condition shown in Fig. 1, where it is shown suspended from the hook by a suitable wire loop hanger 51. The propeller may now be taken to the airplane by causing the tractor to travel along the ground in the usual way. When arrived at the airplane the tractor may be maneuvered to get the elevator platform and the propeller in the proper position below the projecting propeller shaft of the engine. The horizontal piston will be properly maneuvered by means of handle 37 to withdraw the propeller to the inside of the elevator. Thereupon the valve 36 may be manipulated to raise the elevator together with the men to the proper height to cause the propeller hub to substantially register with the shaft 53 of the engine. Thereupon the control handle 37 may again be manipulated to cause the carriage and the hook to bring the hub 54 of the propeller toward the propeller shaft 53. The two valves may be manipulated by one man while the other man guides the hub of the propeller over the propeller shaft.

What I claim is:

1. A conveying and handling unit for attachment to a tractor, comprising a frame for attachment to the tractor and including upright tracks, an elevator guided in said tracks for vertical movement and including a laterally extending arm, a piston-operated carriage guided for longitudinal movement in the arm, said carriage provided with means to support the article to be handled, a hydraulic-operated arm secured to the elevator, a ram cylinder secured to the frame and a hydraulic power plant and controls operable from the elevator for operating the ram and piston, said plant including a pump and a reservoir secured to the frame, the said pump having connections for operation by the power plant of the tractor.

2. A conveying and handling unit for attachment to a tractor having an engine and a power take-off shaft, comprising a frame for attachment to the tractor and including upright tracks, an elevator guided in said tracks for vertical movement and including a laterally extending arm, a piston-operated carriage guided for longitudinal movement in the arm, said carriage provided with means to support the article to be handled, a hydraulic-operated ram secured to the elevator, a ram cylinder secured to the frame and a hydraulic power plant and controls on the elevator for operating the ram and piston, said plant including a pump and a reservoir secured to the frame, the said pump having operating connections with the power take-off shaft of the tractor.

3. A conveying and handling unit for securing to a tractor having an engine and a power take-off shaft, comprising a frame for attachment to the tractor and including upright tracks, an elevator provided with an arm and guided in said tracks for vertical movement, hydraulically shiftable means on the arm to support the article to be handled, a hydraulic-operated ram secured to the elevator, a ram cylinder secured to the frame and a hydraulic power plant and controls for operating the ram and said hydraulic means, said plant including a pump and a reservoir secured to the frame, the said pump having operating connections with the power take-off shaft of the tractor.

4. A conveying and handling unit for attachment to a tractor, having in combination a frame formed of horizontal sill members for attachment to the chassis frame of the tractor, upright track secured to the sill members, an elevator including a hollow shaft and sliding blocks, the latter guided by the tracks, and an arm secured to the top of the hollow shaft, a ram cylinder supported by the said frame and secured inside the hollow shaft, a ram guided in the cylinder and secured to the hollow shaft for raising and lowering the same, and means operable by the power plant of the tractor for furnishing fluid under pressure to raise and lower the ram.

5. A conveying and handling unit for attachment to a tractor having in combination a frame formed of horizontal sill members for attachment to the chassis frame of the tractor, upright tracks secured to the sill members, an elevator including a hollow shaft and sliding blocks, the latter guided by the tracks, and an arm secured to the top of the hollow shaft, a carriage movable in the arm by a piston, a ram cylinder supported by the said frame and secured inside the hollow shaft, a ram guided in the cylinder and secured to the hollow shaft for raising and lowering the same, and means operable by the power plant of the tractor for furnishing fluid under pressure to raise and lower the ram and operate the said piston and carriage.

6. A conveying and handling unit for securing to a tractor, comprising a frame for attachment to the tractor and including upright tracks, an elevator provided with an arm and a platform for supporting one or more men and guided in said tracks for vertical movement, means on the arm to support and laterally shift the article to be handled, a hydraulic-operated ram secured to the elevator, a ram cylinder secured to the frame and a hydraulic power plant and controls on the elevator for operating the ram and the shifting means on the arm, said plant including a pump and a reservoir secured to the frame, the said pump having connections for operation by the power plant of the tractor.

7. A conveying and handling unit for detachable support on a tractor, comprising a frame for attachment to the tractor including upright tracks, an elevator provided with a platform for supporting one or more men and guided in said tracks for up and down movement and including a laterally extending arm, a carriage guided for movement in the arm, said carriage provided with means to support the article to be handled, power-operated means for raising and lowering the elevator and moving the carriage, controls for the same, a power plant secured on the frame and means for connecting the power plant with the tractor to cause the power plant of the unit to be operated by the power plant of the tractor.

DANIEL C. HEITSHU.